(12) United States Patent
Liang et al.

(10) Patent No.: US 8,749,904 B1
(45) Date of Patent: Jun. 10, 2014

(54) DISK DRIVE COMPENSATING FOR TRACK SQUEEZE BY WRITING NON-CIRCULAR SERVO TRACKS

(75) Inventors: Jiangang Liang, San Jose, CA (US); Jeng-Yu Wang, Fremont, CA (US); Siri S. Weerasooriya, Campbell, CA (US); Duc H. Banh, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 44 days.

(21) Appl. No.: 13/406,778

(22) Filed: Feb. 28, 2012

(51) Int. Cl.
*G11B 27/36* (2006.01)

(52) U.S. Cl.
USPC ............... 360/31; 360/77.08; 360/77.17

(58) Field of Classification Search
CPC .... G11B 5/588; G11B 5/592; G11B 5/59655; G11B 5/59688; G11B 5/59633; G11B 5/59627; G11B 5/59661
USPC ............ 360/31, 75, 78.14, 55, 77.04, 77.05, 360/77.06, 77.08, 77.17
See application file for complete search history.

(56) References Cited

U.S. PATENT DOCUMENTS

| | | | |
|---|---|---|---|
| 4,404,605 A * | 9/1983 | Sakamoto | ............... 360/77.17 |
| 4,764,914 A | 8/1988 | Estes et al. | |
| 5,306,994 A * | 4/1994 | Supino | ............... 318/561 |
| 5,416,759 A | 5/1995 | Chun | |
| 5,612,833 A | 3/1997 | Yarmchuk et al. | |
| 5,668,679 A | 9/1997 | Swearingen et al. | |
| 5,793,559 A | 8/1998 | Shepherd et al. | |
| 5,844,742 A | 12/1998 | Yarmchuk et al. | |
| 5,889,631 A | 3/1999 | Hobson | |
| 5,907,447 A | 5/1999 | Yarmchuk et al. | |
| 5,930,068 A | 7/1999 | Gregg et al. | |
| 6,061,200 A | 5/2000 | Shepherd et al. | |
| 6,118,739 A | 9/2000 | Kishinami et al. | |
| 6,128,153 A | 10/2000 | Hasegawa et al. | |
| 6,141,175 A | 10/2000 | Nazarian et al. | |
| 6,181,652 B1 | 1/2001 | Katou et al. | |
| 6,370,094 B1 | 4/2002 | Kishinami et al. | |
| 6,392,834 B1 | 5/2002 | Ellis | |
| 6,421,198 B1 | 7/2002 | Lamberts et al. | |
| 6,442,112 B1 | 8/2002 | Tateishi | |
| 6,476,995 B1 | 11/2002 | Liu et al. | |
| 6,496,322 B1 | 12/2002 | Hasegawa et al. | |
| 6,510,112 B1 | 1/2003 | Sakamoto et al. | |
| 6,522,493 B1 | 2/2003 | Dobbek et al. | |
| 6,563,663 B1 | 5/2003 | Bi et al. | |
| 6,606,214 B1 | 8/2003 | Liu et al. | |
| 6,608,731 B2 | 8/2003 | Szita | |
| 6,611,397 B1 | 8/2003 | Nguyen | |
| 6,624,963 B2 | 9/2003 | Szita | |

(Continued)

*Primary Examiner* — Nabil Hindi (57) ABSTRACT

A servo writer is disclosed operable to write servo sectors on a disk to define non-circular servo tracks. The servo writer comprises control circuitry including a servo control system operable to measure a position of a head over the disk to generate a position signal, generate a position error signal (PES) representing a difference between the position signal and a reference signal, process the PES with a servo compensator to generate a control signal, and position the head over the disk in response to the control signal. A disturbance is induced into the servo control system, and while positioning the head over the disk in response to the control signal, a plurality of servo sectors are written on the disk to define a servo track, wherein the disturbance induced into the servo control system causes the servo track to be non-circular relative to a rotation axis of the disk.

22 Claims, 5 Drawing Sheets

(56) References Cited

U.S. PATENT DOCUMENTS

| | | |
|---|---|---|
| 6,654,198 B2 | 11/2003 | Liu et al. |
| 6,657,810 B1 | 12/2003 | Kupferman |
| 6,667,840 B1 | 12/2003 | Cheong et al. |
| 6,735,040 B2 | 5/2004 | Galloway et al. |
| 6,751,042 B2 | 6/2004 | Bi et al. |
| 6,775,091 B1 | 8/2004 | Sutardja |
| 6,785,084 B2 | 8/2004 | Szita |
| 6,798,606 B2 | 9/2004 | Tang et al. |
| 6,862,155 B2 | 3/2005 | Yang et al. |
| 6,922,304 B2 | 7/2005 | Nakagawa |
| 6,937,420 B1 | 8/2005 | McNab et al. |
| 6,952,320 B1 | 10/2005 | Pollock et al. |
| 6,965,491 B1 | 11/2005 | Perlmutter et al. |
| 6,972,540 B1 | 12/2005 | Wang et al. |
| 6,972,922 B1 | 12/2005 | Subrahmanyam et al. |
| 6,975,478 B2 | 12/2005 | Fukushima et al. |
| 6,977,792 B1 | 12/2005 | Melrose et al. |
| 6,995,941 B1 | 2/2006 | Miyamura et al. |
| 6,999,266 B1 | 2/2006 | Schmidt |
| 7,002,767 B2 | 2/2006 | Annampedu et al. |
| 7,012,778 B2 | 3/2006 | Shigematsu |
| 7,027,255 B2 | 4/2006 | Schmidt |
| 7,054,096 B1 | 5/2006 | Sun et al. |
| 7,057,836 B1 | 6/2006 | Kupferman |
| 7,068,451 B1 | 6/2006 | Wang et al. |
| 7,106,542 B1 | 9/2006 | Sun et al. |
| 7,106,547 B1 | 9/2006 | Hargarten et al. |
| 7,110,209 B2 | 9/2006 | Ehrlich et al. |
| 7,119,981 B2 | 10/2006 | Hanson et al. |
| 7,123,433 B1 | 10/2006 | Melrose et al. |
| 7,167,336 B1 | 1/2007 | Ehrlich et al. |
| 7,230,786 B1 | 6/2007 | Ray et al. |
| 7,257,062 B2 | 8/2007 | Li et al. |
| 7,271,977 B1 | 9/2007 | Melrose et al. |
| 7,286,317 B1 | 10/2007 | Li et al. |
| 7,315,431 B1 | 1/2008 | Perlmutter et al. |
| 7,317,669 B2 | 1/2008 | Lee |
| 7,330,322 B2 | 2/2008 | Hanson et al. |
| 7,333,280 B1 | 2/2008 | Lifchits et al. |
| 7,333,287 B2 | 2/2008 | Hara |
| 7,333,288 B2 | 2/2008 | Kim et al. |
| 7,391,584 B1 | 6/2008 | Sheh et al. |
| 7,408,735 B1 | 8/2008 | Coric |
| 7,436,742 B2 | 10/2008 | Yanagawa |
| 7,457,075 B2 | 11/2008 | Liu et al. |
| 7,460,328 B2 | 12/2008 | Chase et al. |
| 7,460,330 B2 | 12/2008 | Takaishi |
| 7,474,491 B2 | 1/2009 | Liikanen et al. |
| 7,477,473 B2 | 1/2009 | Patapoutian et al. |
| 7,489,469 B2 | 2/2009 | Sun et al. |
| 7,525,754 B2 | 4/2009 | Melrose et al. |
| 7,551,387 B2 | 6/2009 | Sun et al. |
| 7,561,361 B1 | 7/2009 | Rutherford |
| 7,639,447 B1 | 12/2009 | Yu et al. |
| 7,646,559 B1 | 1/2010 | Cheung et al. |
| 7,656,604 B1 | 2/2010 | Liang et al. |
| 7,663,835 B1 | 2/2010 | Yu et al. |
| 7,715,138 B1 | 5/2010 | Kupferman |
| 7,760,455 B2 | 7/2010 | Kang et al. |
| 7,773,328 B1 | 8/2010 | Katchmart et al. |
| 7,791,832 B1 | 9/2010 | Cheung et al. |
| 7,796,479 B2 | 9/2010 | Kim et al. |
| 7,800,859 B2 | 9/2010 | Moriya et al. |
| 7,839,591 B1 | 11/2010 | Weerasooriya et al. |
| 7,876,523 B1 | 1/2011 | Panyavoravaj et al. |
| 7,881,005 B1 | 2/2011 | Cheung et al. |
| 7,924,519 B2 | 4/2011 | Lambert |
| 8,059,360 B1 | 11/2011 | Melkote et al. |
| 8,077,428 B1 | 12/2011 | Chen et al. |
| 8,116,025 B1 | 2/2012 | Chan et al. |
| 8,174,941 B2 | 5/2012 | Takazawa et al. |
| 8,537,486 B2 | 9/2013 | Liang et al. |
| 2001/0040755 A1 | 11/2001 | Szita |
| 2002/0067567 A1 | 6/2002 | Szita |
| 2003/0218814 A9 | 11/2003 | Min et al. |
| 2005/0152246 A1 | 7/2005 | Li et al. |
| 2005/0185319 A1 | 8/2005 | Liu et al. |
| 2005/0275964 A1 | 12/2005 | Hara |
| 2007/0096678 A1 | 5/2007 | Melrose |
| 2007/0097806 A1 | 5/2007 | Beker et al. |
| 2007/0297088 A1 | 12/2007 | Sun et al. |
| 2008/0186617 A1 | 8/2008 | Hosono et al. |
| 2008/0239555 A1 | 10/2008 | Ehrlich et al. |
| 2008/0279059 A1* | 11/2008 | Zhou .................. 369/44.32 |
| 2009/0002874 A1 | 1/2009 | Melrose et al. |
| 2009/0052081 A1 | 2/2009 | Chase et al. |
| 2009/0086364 A1 | 4/2009 | Gerasimov |
| 2010/0020428 A1 | 1/2010 | Mochizuki et al. |
| 2010/0195235 A1 | 8/2010 | Vikramaditya et al. |
| 2010/0214686 A1 | 8/2010 | Higa et al. |
| 2012/0033317 A1 | 2/2012 | Szita |
| 2012/0275050 A1 | 11/2012 | Wilson et al. |

* cited by examiner

DISK DRIVE COMPENSATING FOR TRACK SQUEEZE BY WRITING NON-CIRCULAR SERVO TRACKS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Figure 1:
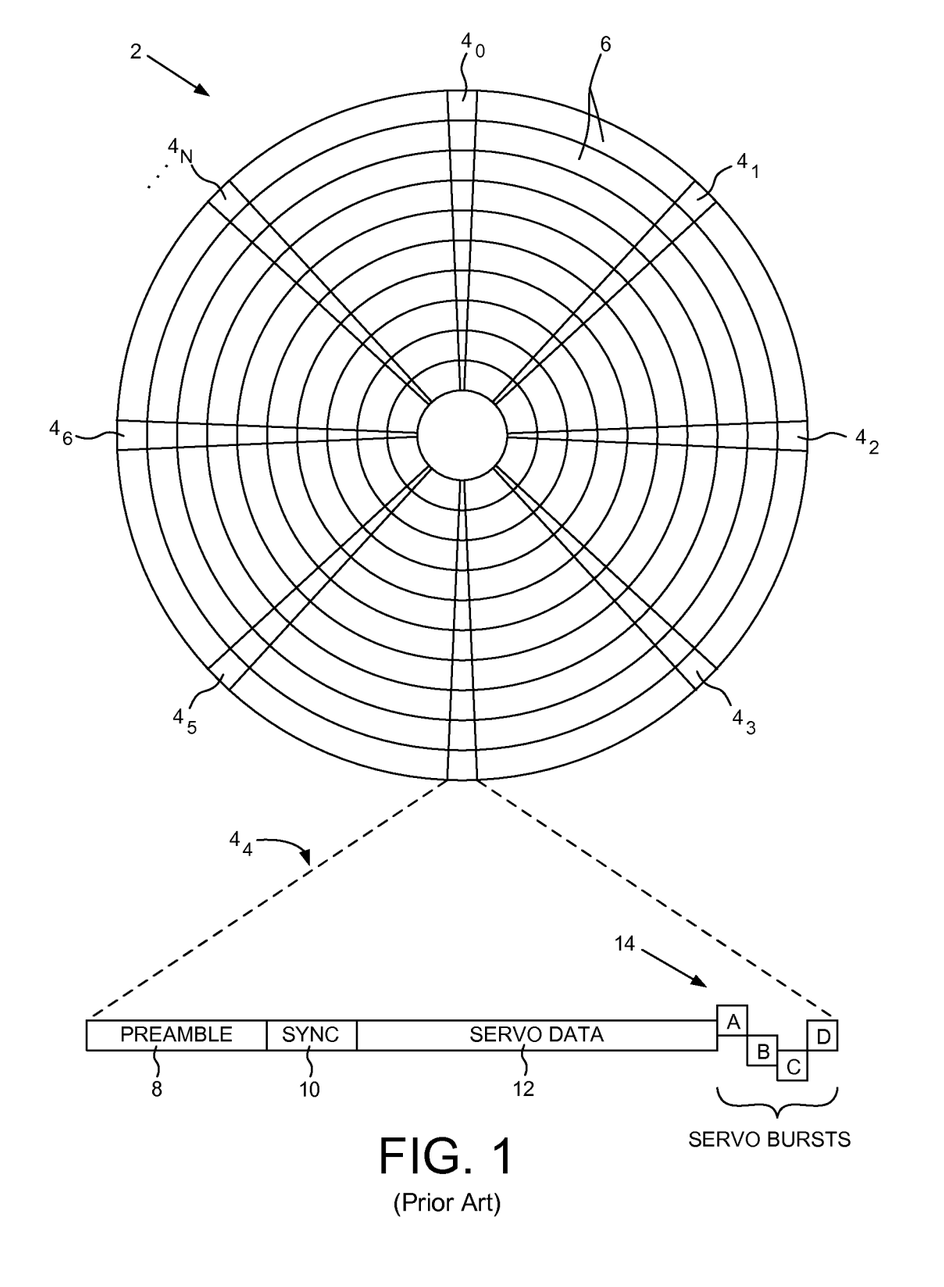
FIG. 1 shows a prior art disk format comprising servo tracks defined by servo sectors.

FIG. 1 shows a prior art disk format 2 as comprising a number of servo tracks 6 defined by servo sectors $4_0$-$4_N$ recorded around the circumference of each servo track. Each servo sector $4_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $4_i$ further comprises groups of servo bursts 14 (A, B, C, D in the example shown), which are recorded with precise intervals and offsets relative to the track centerlines. The servo bursts 14 provide fine head position information used for centerline tracking while accessing a data track during write/read operations.

In some cases, the servo tracks defined by the servo sectors will comprise an eccentricity due, for example, to a non-centric alignment of the disk with the spindle motor. The eccentricity of servo tracks is particularly apparent when the servo sectors are written by a media writer prior to clamping the disk to the spindle motor of a disk drive as compared to writing the servo sectors after installing the disk into the disk drive. In certain designs, the eccentricity of the servo tracks is accounted for by cancelling the effect from the position error signal (PES) used to servo the head in response to the servo sectors, thereby defining substantially circular data tracks.

The data tracks may be defined relative to the servo tracks so as to have the same or a different density than the servo tracks (e.g., a higher density than the servo tracks). In either case, at certain radial and/or circumferential locations the servo tracks may be written too close to one another (track squeeze) which decreases the reliability of the resulting data tracks due to adjacent track interference.

DETAILED DESCRIPTION

Figure 2A:
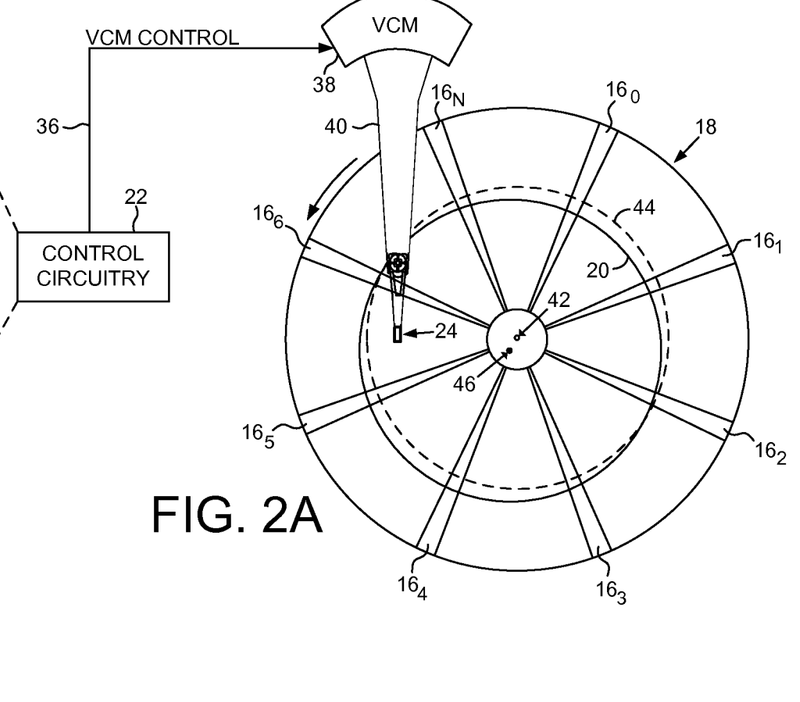
FIG. 2A shows a servo writer according to an embodiment of the present invention comprising a head actuated over a disk by a servo control system included in control circuitry.
Figure 2B:
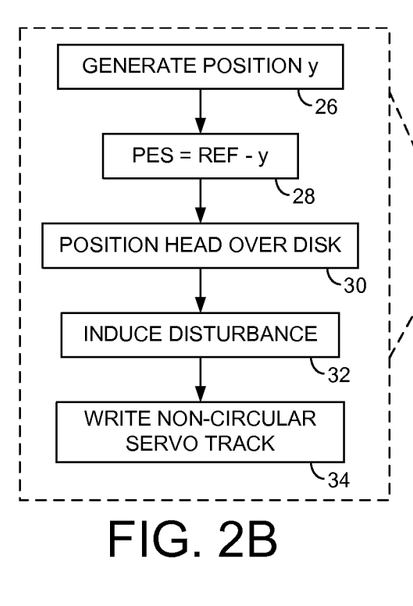
FIG. 2B is a flow diagram according to an embodiment of the present invention wherein a disturbance is induced into the servo control system in order to write non-circular servo tracks.

FIG. 2A shows a servo writer according to an embodiment of the present invention operable to write servo sectors $16_0$-$16_N$ on a disk 18 to define non-circular servo tracks (e.g., servo track 20). The servo writer comprises control circuitry 22 including a servo control system operable to execute the flow diagram of FIG. 2B. A position of a head 24 is measured over the disk to generate a position signal (block 26). A position error signal (PES) is generated representing a difference between the position signal and a reference signal (block 28). The PES is processed with a servo compensator to generate a control signal for positioning the head over the disk (block 30). A disturbance is induced into the servo control system (block 32), and while positioning the head over the disk in response to the control signal, a plurality of servo sectors are written on the disk to define a servo track (block 34), wherein the disturbance induced into the servo control system causes the servo track to be non-circular relative to a rotation axis of the disk 18. For the sake of brevity, throughout this disclosure, "non-circular" will be used to refer to this concept of being "non-circular relative to a rotation axis of the disk." The concept will be further illustrated with respect to FIGS. 2A and 3.

Any suitable servo writer may be employed in the embodiments of the present invention. In one embodiment, the servo writer comprises an external servo writer that measures the position of the head 24 using any suitable device, such as a laser interferometer. An external servo writer typically servo writes the disk after the disk has been inserted into the head disk assembly (HDA) of a disk drive. In another embodiment, the servo writer may comprise a media writer which writes the servo sectors to a plurality of disks, and then one or more of the servo written disks are inserted into the HDA of a disk drive. In yet another embodiment, the servo writer may comprise a disk drive that performs self-servo writing of the servo sectors. In one embodiment, the self-servo writing may be implemented by reading a reference pattern from the disk, such as a plurality of spiral tracks written on the disk. The reference pattern is read in order to measure the position of the head and generate the PES used by the servo control system.

The embodiment of FIG. 2A shows the control circuitry 22 generating a control signal 36 applied to a voice coil motor (VCM) 38 which rotates an actuator arm 40 about a pivot in order to position the head 24 radially over the disk 18. Other embodiments may employ a different type of actuator, such as a linear actuator for actuating the head 24 radially over the disk 18. In one embodiment, an external servo writer may rotate the actuator arm 40 about the pivot by pressing a push pin against the side of the actuator arm while applying a biasing force with the VCM 38.

In the embodiment of FIG. 2A, the rotation axis of the disk 18 is shown as the center 42 of the disk 18 such that a circular servo track 44 (dashed line) would be defined about the center 42 of the disk 18. In contrast to such a circular servo track 44 that is defined about the center 42 of the disk 18, a non-circular servo track 20 is defined by inducing a sinusoidal disturbance into the servo control system at the rotation frequency of the disk while writing the servo sectors. This causes the non-circular servo track 20 to be defined about a center 46 that is offset from the center 42 of the disk 18. Although the embodiment of FIG. 2A shows the rotation axis of the disk 18 as the center 42 of the disk 18, in other embodiments the rotation axis of the disk 18 may be offset from the center 42 of the disk 18 due, for example, to a misalignment of the disk 18 when clamped to a spindle motor that rotates the disk 18.

Figure 3:
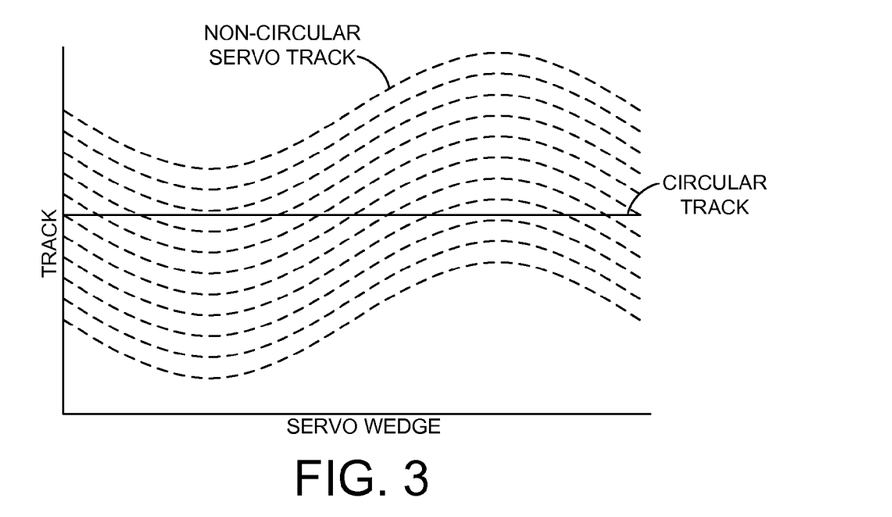
FIG. 3 shows an embodiment of the present invention wherein when the head is substantially stationary relative to the disk the head crosses over multiple of the non-circular servo tracks as the disk rotates.

FIG. 3 illustrates an example of multiple non-circular servo tracks (dashed lines) relative to each servo wedge over a single rotation of the disk 18. In this example, the disturbance induced into the servo control system is a sinusoidal disturbance at the rotation frequency of the disk such that the non-circular servo tracks follow a sinusoidal path as illustrated in FIG. 3. When the head is substantially stationary relative to the disk, the head will follow a substantially circular path as shown in FIG. 3, thereby crossing over multiple of the non-circular servo tracks as the disk rotates.

In one embodiment, the servo control system of the disk drive defines substantially circular data tracks relative to the rotation axis of the disk by canceling the disturbance induced into the servo tracks (by canceling the disturbance from the PES). Accordingly, in one embodiment each circular data track will cross multiple servo tracks as shown in FIG. 3. Defining circular data tracks relative to non-circular servo tracks may improve performance of the disk drive servo control system, for example, by compensating for track squeeze that may manifest in the servo tracks.

Figure 4A:
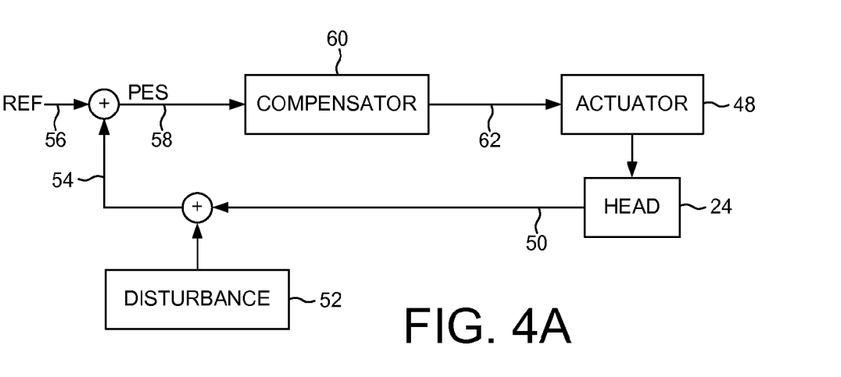
FIG. 4A shows a servo control system according to an embodiment of the present invention wherein the disturbance is induced into a position error signal (PES) by adding the disturbance to a measured position of the head.

The disturbance may be induced at any suitable point into the servo control system. FIG. 4A shows an example servo control system for writing the servo sectors $16_0$-$16_N$ on the disk 18. An actuator 48 (e.g., a VCM) actuates the head 24 over the disk 18, and a position 50 of the head 24 is measured. A disturbance 52 is added to the measured head position 50, and the modified position 54 is subtracted from a reference position 56 to generate a modified PES 58. A suitable compensator 60 processes the modified PES 58 to generate a control signal 62 applied to the actuator 48. In another embodiment, the disturbance 52 may be added to the PES to generate the modified PES 58.

Figure 4B:
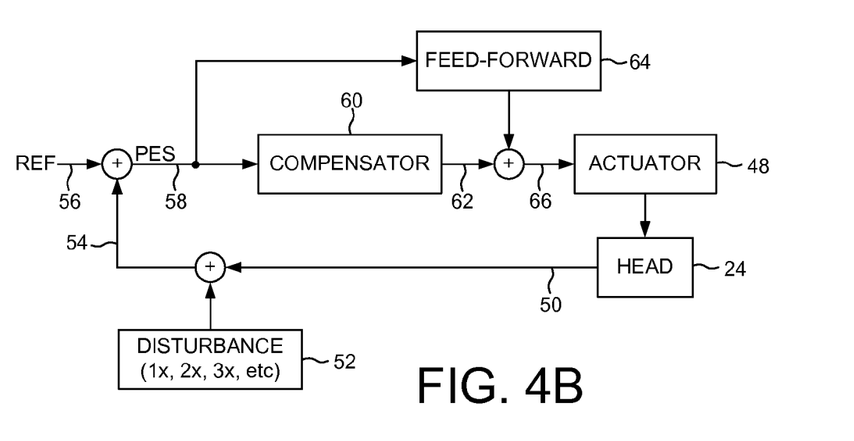
FIG. 4B shows an embodiment of the present invention wherein the servo control system comprises feed-forward compensation to force the head to follow the disturbance in the PES while writing servo sectors on the disk.

FIG. 4B shows another embodiment wherein the servo control system comprises feed-forward compensation 64 generated in response to the modified PES 58. For example, the feed-forward compensation 68 may adapt coefficients of one or more sinusoids to match the disturbance in the modified PES 58. The feed-forward compensation 64 is added to the control signal 62 to generate a modified control signal 66 applied to the actuator 48. The feed-forward compensation 64 forces the head 24 to follow the disturbance in the PES while writing servo sectors $16_0$-$16_N$ on the disk 18.

FIG. 4B also illustrates an embodiment of the present invention wherein the disturbance 52 may comprise a multiple (1×, 2×, 3×, etc.) of a rotation frequency of the disk 18. For example, if the disturbance comprises 1× the disk rotation frequency, the non-circular servo tracks will be circular in form but non-centric relative to the rotation axis of the disk (as shown in FIG. 2A and hence non-circular relative to the rotation axis of the disk). If the disturbance comprises 2× the disk rotation frequency, the non-circular servo tracks will follow a sinusoidal path around the circumference of the disk 18 relative to the rotation axis of the disk 18. In one embodiment, the disturbance may comprise a combination of rotation frequencies (e.g., 1× plus 2× plus 3×). In other embodiments, the disturbance may comprise any suitable deterministic signal including a non-periodic deterministic signal.

Figure 5A:
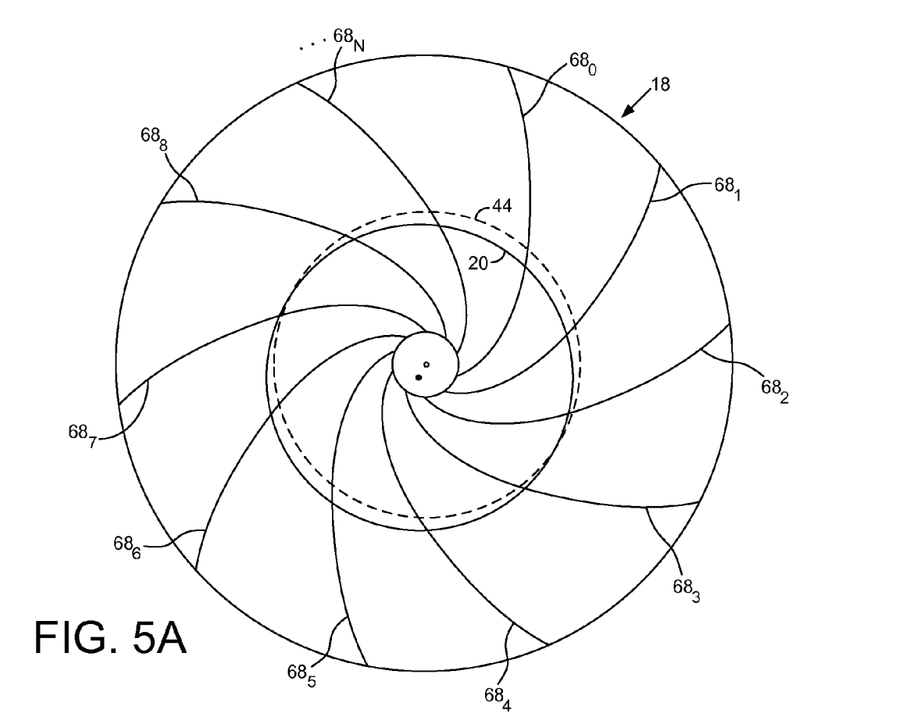
FIG. 5A shows an embodiment of the present invention wherein the servo control system reads a reference pattern (spiral tracks) from the disk in order to measure the position of the head and generate the position signal.
Figure 5B:
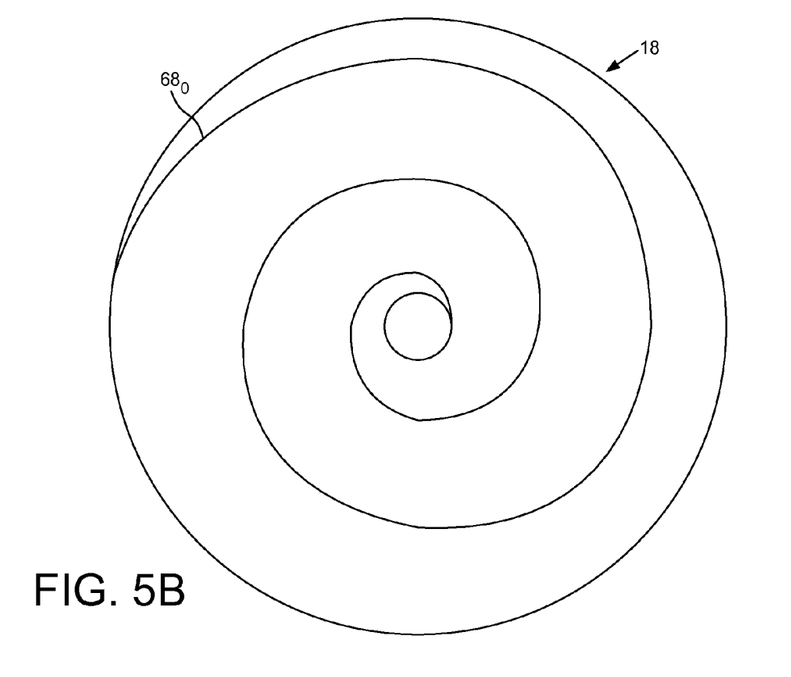
FIG. 5B shows an embodiment of the present invention wherein each spiral track is written over multiple disk revolutions.

In one embodiment, the position of the head 24 when writing the servo sectors $16_0$-$16_N$ on the disk 18 is measured by reading a reference pattern from the disk 18. Any suitable reference pattern may be read from the disk 18, such as a plurality of spiral tracks $68_0$-$68_N$ as shown in the embodiment of FIG. 5A. In one embodiment, each spiral track $68_i$ is written on the disk 18 by moving the head 24 at a substantially constant velocity over the disk 18 while writing a high frequency signal periodically interrupted by a sync mark. When servoing the head 24 while writing the servo sectors $16_0$-$16_N$ on the disk 18, the position of the head 24 may be measured by evaluating the spiral track crossing signal relative to the sync marks. In the embodiment of FIG. 5A, each spiral track $68_i$ is written over a partial disk revolution, whereas in other embodiments each spiral track $68_i$ may be written over multiple disk revolutions as shown in the example of FIG. 5B.

In one embodiment, the reference pattern is substantially circular relative to the rotation axis of the disk 18. In the example embodiment of FIG. 5A, the spiral tracks $68_0$-$68_N$ define a substantially circular path 44 (dashed line) when demodulated normally. Accordingly, the disturbance 52 is added into the servo control system that would otherwise follow the circular path 44 defined by the spiral tracks $68_0$-$68_N$, thereby writing the servo sectors so as to define the non-circular servo track 20.

In one embodiment, the reference pattern on the disk 18 may be non-circular relative to the rotation axis of the disk 18. For example, in the embodiment where the reference pattern comprises spiral tracks, the spiral tracks may define a non-circular path relative to the rotation axis of the disk 18 (referred to as repeatable runout) due, for example, to errors when writing the spiral tracks $68_0$-$68_N$ on the disk 18. In one embodiment, the repeatable runout of the reference pattern (e.g., spiral tracks) may be learned by the servo writer prior to writing the servo sectors on the disk. The disturbance induced into the servo control system may then be generated relative to the learned repeatable runout of the reference pattern. For example, the disturbance may be generated with the same phase as the repeatable runout so that the disturbance is additive to the repeatable runout.

Figure 6A:
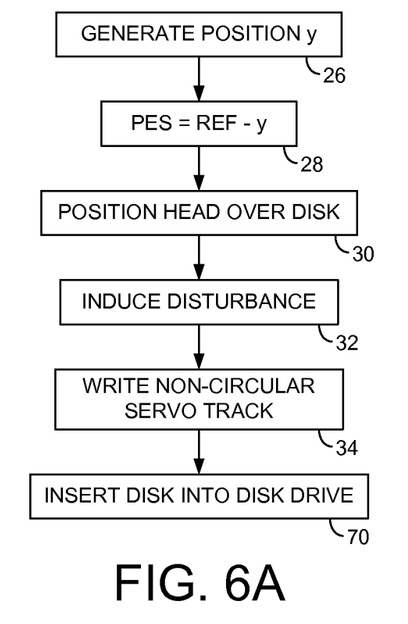
FIG. 6A is a flow diagram according to an embodiment of the present invention wherein the disk is inserted into a disk drive after writing the servo sectors on the disk.

FIG. 6A is a flow diagram according to an embodiment of the present invention wherein the servo writer writes the servo sectors on the disk to define non-circular servo tracks (blocks 26-34) prior to inserting the disk into a disk drive (block 70). For example, a media writer may be used to servo write one or more disks to define non-circular servo tracks on each disk, and then one or more of the disks may be inserted into a disk drive. In this embodiment, the control circuitry within the disk drive may learn the disturbance (e.g., frequency and phase), for example, by adapting coefficients of one or more sinusoids. The learned disturbance is then subtracted from the PES of the servo control system so that the head follows a substantially circular data track during write/read operations.

Figure 6B:
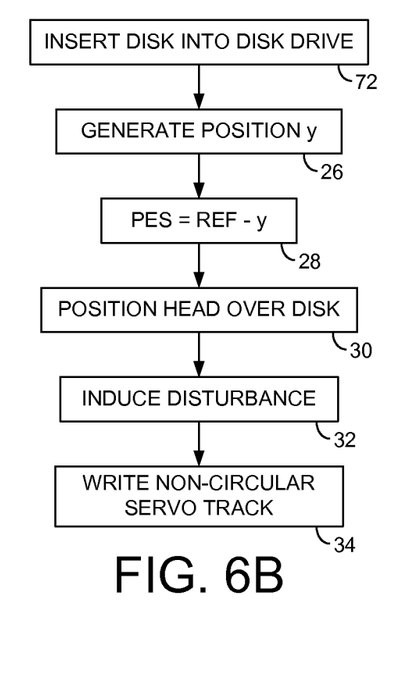
FIG. 6B is a flow diagram according to an embodiment of the present invention wherein the disk is inserted into a disk drive prior to writing the servo sectors on the disk.

FIG. 6B is a flow diagram according to an embodiment of the present invention wherein one or more disks are first inserted into a disk drive (block 72), and then the servo sectors are written on the disk (blocks 26-34) using, for example, an external servo writer or the disk drive self-servo writing the servo sectors. For example, the control circuitry within the disk drive may read a reference pattern on the disk (e.g., spiral tracks) in order to servo the head while writing the servo sectors on the disk as described above. Since the control circuitry internal to the disk drive generates the disturbance for self-writing the non-circular servo tracks after the disk has been inserted into the disk drive, the control circuitry has a priori knowledge of the disturbance. Accordingly, in one embodiment the control circuitry may use the known disturbance during normal operation in order to define the substantially circular data tracks by subtracting the known disturbance from the PES of the servo control system during write/read operations. In yet another embodiment, the control circuitry may learn any residual runout in the PES by adapting coefficients of one or more sinusoids, and then subtract the learned residual disturbance from the PES of the servo control system so the head follows a substantially circular data track during write/read operations.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A servo writer operable to write servo sectors on a disk to define non-circular servo tracks, the servo writer comprising control circuitry including a servo control system operable to:
    measure a position of a head over the disk to generate a position signal;
    generate a position error signal (PES) representing a difference between the position signal and a reference signal;
    process the PES with a servo compensator to generate a control signal; and
    position the head over the disk in response to the control signal;
    wherein the control circuitry is operable to:
    induce a disturbance into the servo control system; and
    while positioning the head over the disk in response to the control signal, write a plurality of servo sectors on the disk to define a servo track, wherein the disturbance induced into the servo control system causes the servo track to be non-circular relative to a rotation axis of the disk.

2. The servo writer as recited in claim 1, wherein after writing the non-circular servo tracks on the disk when the head is substantially stationary relative to the disk the head crosses over multiple of the non-circular servo tracks as the disk rotates.

3. The servo writer as recited in claim 1, wherein the servo control system is further operable to:
    induce the disturbance into the PES to generate a modified PES;
    generate a feed-forward signal in response to the modified PES; and
    adjust the control signal in response to the feed-forward signal, wherein the head is positioned over the disk using the adjusted control signal.

4. The servo writer as recited in claim 1, wherein the disturbance comprises a sinusoid.

5. The servo writer as recited in claim 4, wherein a frequency of the sinusoid comprises a rotation frequency of the disk.

6. The servo writer as recited in claim 4, wherein a frequency of the sinusoid comprises a multiple of a rotation frequency of the disk.

7. The servo writer as recited in claim 1, wherein the servo control system is further operable to read a reference pattern from the disk in order to measure the position of the head over the disk to generate the position signal.

8. The servo writer as recited in claim 7, wherein the reference pattern is substantially circular relative to the rotation axis of the disk.

9. The servo writer as recited in claim 7, wherein the reference pattern comprises a plurality of spiral tracks.

10. The servo writer as recited in claim 1, wherein the disk is inserted into a disk drive after writing the servo sectors on the disk.

11. The servo writer as recited in claim 1, wherein the disk is inserted into a disk drive prior to writing the servo sectors on the disk.

12. A method of writing servo sectors on a disk to define non-circular servo tracks, the method comprising:
    measuring a position of a head over the disk to generate a position signal;
    generating a position error signal (PES) representing a difference between the position signal and a reference signal;
    inducing a disturbance into the PES to generate a modified PES;
    processing the modified PES with a servo compensator to generate a control signal;
    positioning the head over the disk in response to the control signal; and
    while positioning the head over the disk in response to the control signal, writing a plurality of servo sectors on the disk to define a servo track, wherein the disturbance induced into the PES causes the servo track to be non-circular relative to a rotation axis of the disk.

13. The method as recited in claim 12, wherein after writing the non-circular servo tracks on the disk when the head is substantially stationary relative to the disk the head crosses over multiple of the non-circular servo tracks as the disk rotates.

14. The method as recited in claim 12, further comprising:
    generating a feed-forward signal in response to the modified PES; and adjusting the control signal in response to the feed-forward signal, wherein the head is positioned over the disk using the adjusted control signal.

15. The method as recited in claim 12, wherein the disturbance comprises a sinusoid.

16. The method as recited in claim 15, wherein a frequency of the sinusoid comprises a rotation frequency of the disk.

17. The method as recited in claim 15, wherein a frequency of the sinusoid comprises a multiple of a rotation frequency of the disk.

18. The method as recited in claim 12, further comprising reading a reference pattern from the disk in order to measure the position of the head over the disk to generate the position signal.

19. The method as recited in claim 18, wherein the reference pattern is substantially circular relative to the rotation axis of the disk.

20. The method as recited in claim 18, wherein the reference pattern comprises a plurality of spiral tracks.

21. The method as recited in claim 12, further comprising inserting the disk into a disk drive after writing the servo sectors on the disk.

22. The method as recited in claim 12, further comprising inserting the disk into a disk drive prior to writing the servo sectors on the disk.

* * * * *